United States Patent
Li (10) Patent No.: US 11,954,401 B2
(45) Date of Patent: Apr. 9, 2024

(54) METHOD FOR SELECTING AUDIO OUTPUT DEVICE, AND DISPLAY APPARATUS

(71) Applicant: Hisense Visual Technology Co., Ltd., Shandong (CN)

(72) Inventor: Xianqi Li, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 77 days.

(21) Appl. No.: 17/814,131

(22) Filed: Jul. 21, 2022

(65) Prior Publication Data

US 2022/0357913 A1 Nov. 10, 2022

Related U.S. Application Data

(63) Continuation of application No. PCT/CN2020/104626, filed on Jul. 24, 2020.

(30) Foreign Application Priority Data

Jun. 19, 2020 (CN) .......................... 202010568836.7

(51) Int. Cl.
*G06F 3/16* (2006.01)
*H04N 21/443* (2011.01)
*H04N 21/485* (2011.01)

(52) U.S. Cl.
CPC .......... *G06F 3/165* (2013.01); *H04N 21/4432* (2013.01); *H04N 21/4852* (2013.01)

(58) Field of Classification Search
CPC .............. G06F 3/165; H04N 21/43635; H04N 21/439; H04N 21/4432; H04N 21/4852
See application file for complete search history.

(56) References Cited

U.S. PATENT DOCUMENTS 9,786,294 B1* 10/2017 Bezos ................ G06F 3/165
2011/0150431 A1* 6/2011 Klappert ............ H04N 21/433
386/277

(Continued)

FOREIGN PATENT DOCUMENTS

CN 1753316 A 3/2006
CN 102780865 A 11/2012
(Continued)

OTHER PUBLICATIONS

International Search Report, dated Feb. 24, 2021, from PCT/CN2020/104626 filed Jul. 24, 2020.

*Primary Examiner* — Amy R Hsu
(74) *Attorney, Agent, or Firm* — Workman Nydegger (57) ABSTRACT

Disclosed are a method for selecting an audio output device and a display apparatus. The method includes: in response to a power cutoff command, saving a first device list and performing a first set of operations associated with the power cutoff command; while the display apparatus is in a power off state, receiving a power on command; in response to the power on command, performing a second set of operations associated with a power on process; in response to a first audio output device having connected with the display apparatus, determining whether a first identifier of the first audio output device is same as the identifier of the current sound output device; and in response to the first identifier of the first audio output device being same as the identifier of the current sound output device, taking the first audio output device as the current sound output device.

20 Claims, 7 Drawing Sheets

(56) References Cited

U.S. PATENT DOCUMENTS

| | | | |
|---|---|---|---|
| 2017/0242653 A1* | 8/2017 | Lang | G10L 15/14 |
| 2018/0084233 A1* | 3/2018 | Lara | H04N 9/3141 |
| 2018/0234637 A1* | 8/2018 | Marino | H04N 5/63 |
| 2019/0268569 A1* | 8/2019 | Takita | H04L 65/403 |

FOREIGN PATENT DOCUMENTS

| | | |
|---|---|---|
| CN | 102938256 A | 2/2013 |
| CN | 204719939 U | 10/2015 |
| CN | 105916010 A | 8/2016 |
| CN | 107197367 A | 9/2017 |
| CN | 110062366 A | 7/2019 |
| CN | 110177012 A | 8/2019 |
| CN | 110719543 A | 1/2020 |
| CN | 111050198 A | 4/2020 |
| CN | 111208969 A | 5/2020 |
| JP | 2014011681 A | 1/2014 |

* cited by examiner

Fig. 4A (Before updating)　　　　　　　　　　　　　　　　　(After updating)
First device list　　　　Second device list　　　　First device list

| 0000 0010 0000 0111 | + | 0000 0010 0000 1111 | = | 0000 0010 0000 1111 |

Fig. 4B (Before updating)　　　　　　　　　　　　　　　　　(After updating)
First device list　　　　Second device list　　　　First device list

| 0000 0010 0000 0111 | + | 0000 0010 0000 0101 | = | 0000 0010 0000 0101 |

METHOD FOR SELECTING AUDIO OUTPUT DEVICE, AND DISPLAY APPARATUS

CROSS REFERENCE TO RELATED APPLICATIONS

This application is a continuation of International Application No. PCT/CN2020/104626, filed on Jul. 24, 2020, which claims the priority of the application No. CN 202010568836.7 filed on Jun. 19, 2020. The entire contents of this application are incorporated herein by reference.

FIELD

The present disclosure relates to software, in particular to a method for selecting an audio output device, and a display apparatus.

BACKGROUND

A display apparatus supports different external audio output devices in order to satisfy user's advanced experience for sound effects. The external audio output devices include: a Display Speaker device (a built-in Speaker device, hereinafter Speaker device), an Audio Return Channel device (ARC device), a Bluetooth Device (hereinafter BT device) and so on. Although there are multiple audio output devices, only one sound output device can output audio to the Speaker device at the same moment. Therefore, it is necessary to adopt a certain control strategy for a sound playing sequence of these audio output devices, so that it can be executed according to configurations, and one audio output device can be selected for use.

However, upon turning on a display apparatus, the playing sequence of the external devices configured in the previous on state can not be ensured, since the sound playing sequence in this turning on of the display apparatus is usually determined based on power-on and connection speeds of the external devices. A connection speed of the audio output device is limited by performance of the audio output device and television performance. For example, the connection speed of the same audio output device from different manufacturers can vary significantly; and response time of connection of the same audio output device at the different moments is also not fixed. Therefore, the connection speed of the audio output device after the display apparatus is powered on is unpredictable, which leads to a problem of inconsistent sound output before and after the display apparatus is powered on and off, resulting in poor user experience.

SUMMARY

The present disclosure provides a method for selecting an audio output device, and a display apparatus.

Embodiments of the present disclosure provide a display apparatus. The display apparatus includes a display; a speaker, configured to play audio output from a sound output device; and a controller, in connection with the display and the speaker and configured to cause the display apparatus to: in response to a power cutoff command, save a first device list and perform a first set of operations associated with the power cutoff command, wherein the first device list includes an identifier of a current sound output device of the display apparatus before the power cutoff command, and the first set of operations includes electrical disconnection of one or more sound output devices from the display apparatus; while the display apparatus is in a power off state after the power cutoff command, receive a power on command; in response to the power on command, perform a second set of operations associated with a power on process of the display apparatus, wherein the second set of operations includes monitoring connecting status of one or more sound output devices during the power on process; in response to a first audio output device having connected with the display apparatus, determine whether a first identifier of the first audio output device is same as the identifier of the current sound output device in the first device list; and in response to the first identifier of the first audio output device being same as the identifier of the current sound output device, take the first audio output device as the current sound output device of the display apparatus in the power on process.

Embodiments of the present disclosure provide a method for selecting an audio output device in a display apparatus, including: in response to a power cutoff command of the display apparatus, saving a first device list and performing a first set of operations associated with the power cutoff command, wherein the first device list includes an identifier of a current sound output device of the display apparatus before the power cutoff command, and the first set of operations includes electrical disconnection of one or more sound output devices from the display apparatus; while the display apparatus is in a power off state after the power cutoff command, receiving a power on command; in response to the power on command, performing a second set of operations associated with a power on process of the display apparatus, wherein the second set of operations includes monitoring connecting status of one or more sound output devices during the power on process; in response to a first audio output device having connected with the display apparatus, determining whether a first identifier of the first audio output device is same as the identifier of the current sound output device in the first device list; and in response to the first identifier of the first audio output device being same as the identifier of the current sound output device, taking the first audio output device as the current sound output device of the display apparatus in the power on process.

DETAILED DESCRIPTION OF THE EMBODIMENTS

In order to make the objectives, schemes and advantages of the exemplary embodiments of the present disclosure more clear, the exemplary embodiments of the present disclosure will be described clearly and completely with reference to drawings in the exemplary embodiments of the present disclosure. Obviously, the described exemplary embodiments are only some, but not all the embodiments.

Figure 1A:
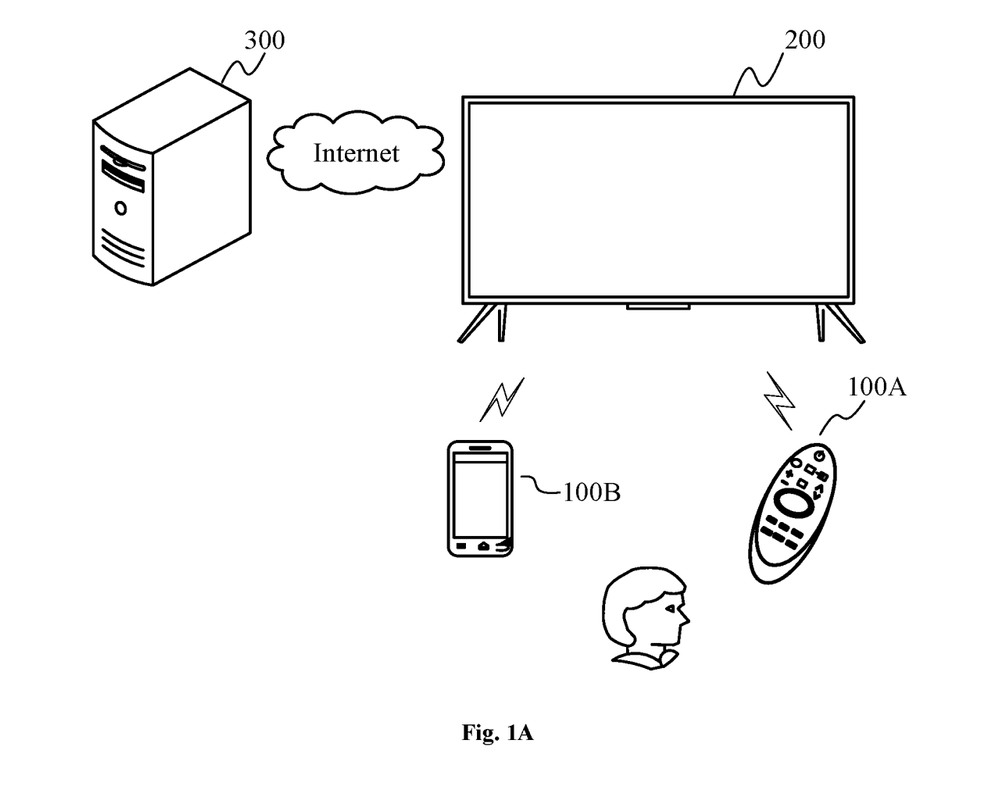
FIG. 1A illustrates a schematic diagram of an operation scenario between a display apparatus 200 and a control device 100.

FIG. 1A illustrates a schematic diagram of an operation scenario between a display apparatus 200 and a control device 100. As shown in FIG. 1A, communication between the control device 100 and the display apparatus 200 may be performed in a wired or wireless manner.

The control device 100 is configured to control the display apparatus 200, may receive commands input from a user and convert the commands into instructions that can be recognized and responded by the display apparatus 200, and acts as an intermediary for interaction between the user and the display apparatus 200.

The control device 100 may be a remote control 100A, including infrared protocol communication or Bluetooth protocol communication and other short range communication modes, to control the display apparatus 200 via wireless or other wired modes. A user may input user commands through keys, voice input, control panel input, and the like on a remote control to control the display apparatus 200.

The control device 100 may also be a smart device, such as a mobile terminal 100B, a tablet, a computer and a notebook computer. For example, the display apparatus 200 is controlled by using an application running on a smart device. The application, through configuration, may provide a variety of controls for the user through an intuitive user interface (UI) on a screen associated with the smart device.

Applications may be installed on both the mobile terminal 100B and the display apparatus 200, so as to realize communication according to a network communication protocol for the purpose of one-to-one control operation and data communication. For example, a control instruction protocol may be established between the mobile terminal 100B and the display apparatus 200 to achieve functions of physical keys, for example, arranged on the remote control 100A by operating various functional keys or virtual buttons of a user interface provided on the mobile terminal 100B. Audio and video contents displayed on the mobile terminal 100B may also be cast onto the display apparatus 200 so as to realize a synchronous display function.

The display apparatus 200 may be implemented as a television, and may provide a broadcast reception television function and an intelligent network television function that a computer supports. The display apparatus includes a digital television, a network television, a smart television, an internet protocol television (IPTV) and the like.

The display apparatus 200 may be a liquid crystal display, an organic light emitting display, and a projection display device. Specific display apparatus types, sizes, resolutions, and the like are not limited.

The display apparatus 200 may further be in data communication with a server 300 through multiple communication manners. Here, the display apparatus 200 may be allowed to be in communication connection through a local area network (LAN), a wireless local area network (WLAN) and other networks. The server 300 may provide various contents and interactions to the display apparatus 200. Exemplarily, the display apparatus 200 may send and receive information, such as receiving electronic program guide (EPG) data, receiving software program updates, or accessing a remotely stored digital media library. Other web service content such as video-on-demand and advertising services is provided through the server 300.

Figure 1B:
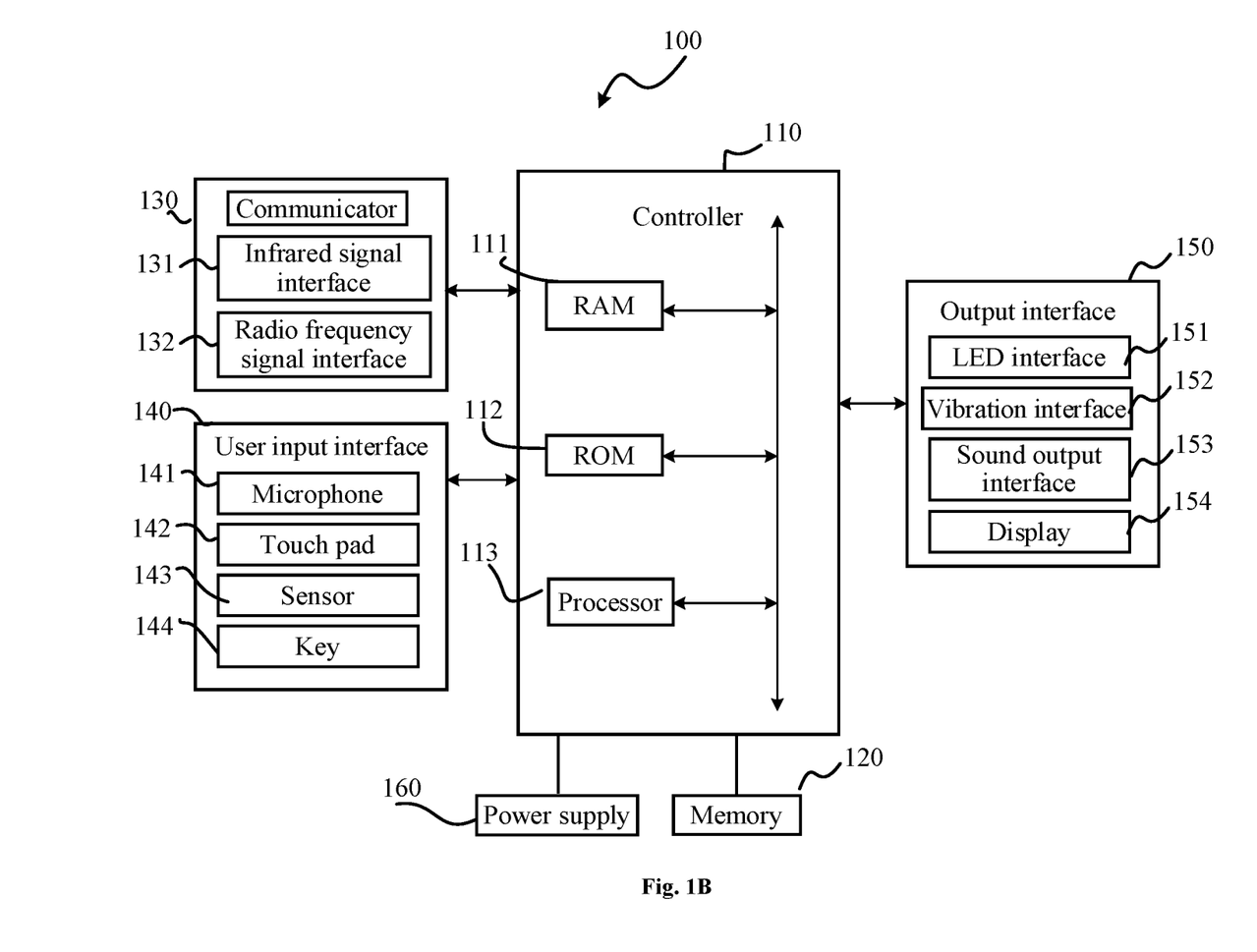
FIG. 1B illustrates a configuration block diagram of the control device 100 in FIG. 1A.

FIG. 1B illustrates a configuration block diagram of a control device 100. As shown in FIG. 1B, the control device 100 includes a controller 110, a memory 120, a communicator 130, a user input interface 140, an output interface 150, and a power supply 160.

The controller 110 includes a random access memory (RAM) 111, a read only memory (ROM) 112, a processor 113, a communication interface, and a communication bus. The controller 110 is configured to control running and operations of the control device 100, communication cooperation between internal components, and external and internal data processing functions.

Exemplarily, when an interaction that the user presses keys arranged on the remote control 100A or touches a touch panel arranged on the remote control 100A is detected, the controller 110 may control to generate a signal corresponding to the detected interaction, and sends the signal to the display apparatus 200.

The memory 120 is configured to store various running programs, data and applications for driving and controlling the control device 100 under control of the controller 110. The memory 120 may store various control signal instructions input from the user.

The communicator 130 realizes communication of control signals and data signals with the display apparatus 200 under the control of the controller 110. For example, the control device 100 sends a control signal (such as a touch signal or a key signal) to the display apparatus 200 through the communicator 130, and the control device 100 may receive a signal sent from the display apparatus 200 via the communicator 130. The communicator 130 may include an infrared signal interface 131 and a radio frequency signal interface 132. For example, an infrared signal interface may be configured to convert a user input command into an infrared control signal according to an infrared control protocol, which may be sent to the display apparatus 200 via an infrared sending module. For another example, a radio frequency signal interface may be configured to convert a user input command into a digital signal, and then modulate the digital signal according to a radio frequency signal modulation protocol and then sent the signal to the display apparatus 200 via a radio frequency transmission module.

The user input interface 140 may include at least one of a microphone 141, a touch pad 142, a sensor 143, a key 144, or the like, so that a user may input a user command for controlling the display apparatus 200 to the control device 100 through voice, touch, a gesture, press or the like.

The output interface 150 outputs a user command received via the user input interface 140 to the display apparatus 200, or outputs an image or a voice signal received by the display apparatus 200. Here, the output interface 150 may include an LED interface 151, a vibration interface 152 that generates vibration, a sound output interface 153 that outputs sound, a display 154 that outputs an image, and the like. For example, the remote control 100A may receive output signals such as audio, video or data from the output interface 150, display the output signals on the display 154 in an image form, output signals via the sound output interface 153 in an audio form, or output signals via the vibration interface 152 in a vibration form.

The power supply 160 is configured to provide power support for components of the control device 100 under the control of the controller 110. The power supply may be in the form of a battery and an associated control circuit.

Figure 1C:
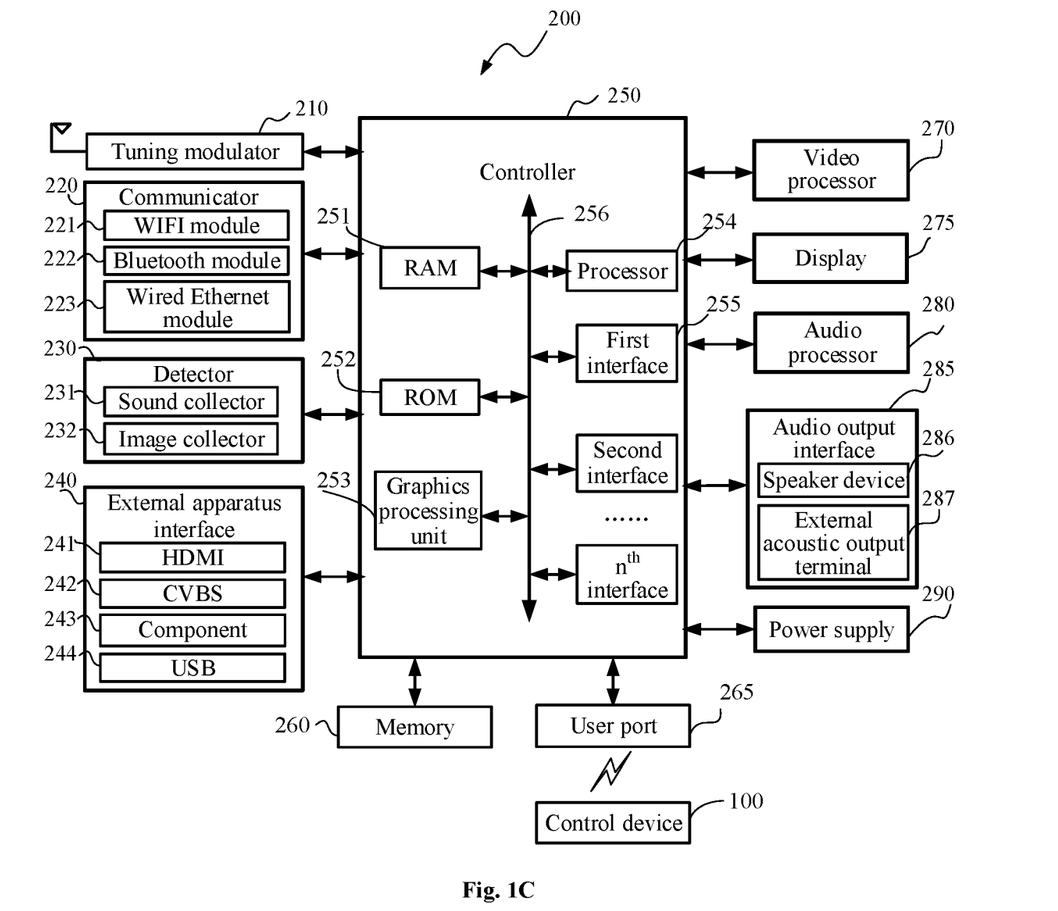
FIG. 1C illustrates a configuration block diagram of the display apparatus 200 in FIG. 1A.

FIG. 1C illustrates a block diagram of hardware configuration of the display apparatus 200. As shown in FIG. 1C, the display apparatus 200 may further include a tuning demodulator 210, a communicator 220, a detector 230, an external device interface 240, a controller 250, a memory 260, a user interface 265, a video processor 270, a display 275, an audio processor 280, an audio output interface 285, and a power supply 290.

The tuning demodulator 210 is configured to receive broadcast television signals in a wired or wireless manner, may perform modulation-demodulation processing such as amplification, frequency mixing and resonance, and is configured to demodulate an audio and video signal carried in a frequency of a television channel selected by a user and additional information (for example, EPG data) from multiple wireless or wired broadcast television signals.

The tuning demodulator 210 may respond to the frequency of the television channel selected by the user and the television signal carried by the frequency under the control of the controller 250 according to user selection.

The tuning demodulator 210 may receive multiple signals in a variety of ways depending on different broadcast systems of the television signals, such as terrestrial broadcasting, cable broadcasting, satellite broadcasting, internet broadcasting, or the like; depending on different modulation types, the tuning demodulator may adopt a digital modulation mode or an analog modulation mode; and an analog signal and a digital signal may be demodulated depending on the different types of television signals received.

In some exemplary embodiments, the tuning demodulator 210 may also be in an external device, such as an external set top box. In this way, the set top box outputs television signals after modulation and demodulation to input the signals into the display apparatus 200 through the external device interface 240.

The communicator 220 is a component for communicating with an external device or an external server according to various communication protocol types. For example, the display apparatus 200 may send content data to an external device connected via the communicator 220, or browse and download the content data from an external device connected via the communicator 220. The communicator 220 may include a WIFI module 221, a Bluetooth module 222, a wired Ethernet module 223, and other network communication protocol modules or near field communication protocol modules, so that the communicator 220 may receive a control signal from the control device 100 according to the control of the controller 250, and implement the control signal as a WIFI signal, a Bluetooth signal, a radio frequency signal or the like.

The detector 230 is a component of the display apparatus 200 to capture external environment or external interaction signals. The detector 230 may include an image collector 232, such as a camera and a webcam, which may be configured to collect an external environment scenario so as to change display parameters of the display apparatus 200 accordingly; and configured to collect attributes of the user or gestures interacting with the user, so as to realize an interactive function between the display apparatus and the user. The detector may further include an optical receiver, configured to collect an environment light intensity so as to be self-adaptive to the display parameter change of the display apparatus 200.

In other exemplary embodiments, the detector 230 may further include a temperature sensor, for example, the display apparatus 200 may self-adaptively adjust a display color temperature of an image by sensing an environment temperature. Exemplarily, when the environment temperature is high, the color temperature of the image displayed by the display apparatus 200 may be adjusted to a relatively cold tune; and when the environment temperature is low, the color temperature of the image presented by the display apparatus 200 may be adjusted to a relatively warm tune.

In some other exemplary embodiments, the detector 230 may further include a sound collector 231, such as a microphone, which may be configured to receive a user's voice, such as a voice signal of a control command from a user to control the display apparatus 200; or may collect ambient sound for identifying ambient scenario types, so that the display apparatus 200 may be self-adaptive to ambient noise.

The external apparatus interface 240 is a component that provides the controller 210 to control data transmission between the display apparatus 200 and an external device. The external apparatus interface 240 may be connected with external devices such as a set top box, a game device and a laptop computer in a wired/wireless manner, and may receive data such as a video signal (such as a motion image), an audio signal (such as music), additional information (such as EPG) of the external devices.

The external device interface 240 may include any one or more of a high definition multimedia interface (HDMI) interface 241, a composite video blanking synchronization (CVBS) interface 242, an analog or digital component interface 243, a universal serial bus (USB) interface 244, a component interface (not shown), or a red green blue (RGB) interface (not shown).

The controller 250 controls the operation of the display apparatus 200 and responds to operations of a user by running various software programs, such as an operating system and various applications, stored on the memory 260.

As shown in FIG. 1C, the controller 250 includes a random access memory (RAM) 251, a read only memory (ROM) 252, a graphics processing unit 253, a processor 254, a communication interface 255, and a communication bus 256. The RAM 251, ROM 252, the graphics processing unit 253, the processor 254 and the communication interface 255 are connected through the communication bus 256.

The ROM 252 is used for storing various system startup instructions. The display apparatus 200 is started when a power signal is received, the CPU processor 254 runs the system start instructions in the ROM 252, copies the operating system stored in the memory 260 to the RAM 251 to start running the operating system. When the operating system startup is completed, the CPU processor 254 then copies the various applications in the memory 260 in the RAM 251, and then begins to start the various applications.

The graphics processor 253 is configured to generate various graphic objects, such as an icon, an image, and an operating menu. The graphics processor 253 may include an operator, configured to perform computation by receiving various interactive commands input from the user and then display various objects according to display properties; and include a renderer, configured to generate the various objects obtained based on the operator and display a rendered result on the display 275.

The processor 254 is configured to run the operating system and the application instructions stored in the memory 260, and execute various applications, data and contents according to the user input command, so as to ultimately display and play the various audio and video contents.

In some exemplary embodiments, the processor 254 may include multiple processors. The multiple processors may include one main processor and one or more sub processors.

The communication interface 255 may include a first interface to an n$^{th}$ interface. These interfaces may be network interfaces connected with an external device via a network.

The controller 250 may control the overall operation of the display apparatus 200. For example, in response to receiving a user input command for selecting a GUI object displayed on the display 275, the controller 250 may execute the operation related to the object selected by the user input command.

The memory 260 is configured to store various types of data, software programs or applications for driving and controlling the display apparatus 200 to run. The memory 260 may include a volatile and/or nonvolatile memory. The term "memory" includes the memory 260, the RAM 251 and ROM 252 of the controller 250, or a memory card in the display apparatus 200.

In some embodiments, the memory 260 is specifically configured to store driving programs and relevant data of the tuning demodulator 210, the communicator 220, the detector 230, the external apparatus interface 240, the video processor 270, the display 275, the audio processor 280 and the like, for example, external data (such as audio and video data) received from the external apparatus interface, or user data (such as key information, voice information, and touch information) received from a user input interface.

In some embodiments, the memory 260 specifically stores software and/or programs configured to represent the operating system (OS). These software and/or programs may include, for example: a kernel, middleware, an application programming interface (API) and/or an application. Exemplarily, the kernel may control or manage system resources, and functions implemented by other programs (such as the middleware, the API or the application); and meanwhile, the kernel may provide an interface so as to allow the middleware, the API or the applications to access the controller to control or manage the system resources.

Figure 1D:
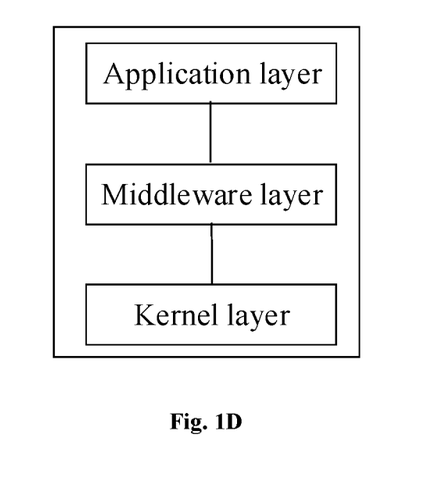
FIG. 1D illustrates a configuration block diagram of architecture of an operating system in a memory of a display apparatus 200.

FIG. 1D illustrates a configuration block diagram of an architecture of an operating system in the memory of the display apparatus 200. The operating system architecture includes an application layer, a middleware layer and a kernel layer from top to bottom in sequence.

For the application layer, both built-in applications of the system and non-system-level applications belong to the application layer, which is responsible for being directly interacted with the user. The application layer may include a plurality of applications, such as a setup application, and a media center application. These applications may be implemented as Web applications which are executed based on a WebKit engine, and specifically may be developed and executed on the basis of HTML, a cascading style sheet (CSS), and JavaScript.

The middleware layer may provide some standard interfaces so as to support operations of various environments and systems. For example, the middleware layer may be implemented as a multimedia and hypermedia information coding expert group (MHEG) of the middleware relevant to data broadcasting, may further be implemented as DLNA middleware of the middleware relevant to external device communication, and may further be implemented as middleware providing browser environments run by all the applications in the display apparatus.

The kernel layer provides core system services, for example: file management, memory management, process management, network management and system security permission management. The kernel layer may be implemented as a kernel based on various operating systems, for example, a kernel based on a Linux operating system.

The kernel layer also provides communication between system softwares and hardwares, and provides device driving services for various hardwares, for example: provides a driver for the display panel, provides a webcam driver for the webcam, provides a key driver for the remote control, provides a WiFi driver for a WIFI module, provides an audio driver for an audio output interface, provides power management driver for a power management (PM) module, and so on.

The user input interface 265 receives various user interactions. Specifically, the user input interface is configured to send an input signal from the user to the controller 250, or transmits an output signal from the controller 250 to the user. Exemplarily, the remote control 100A may send the input signals, such as a power signal, a channel selection signal, and a volume adjusting signal, input from the user via the user input interface 265, and then the input signals are forwarded to the controller 250 by the user interface 265; or the remote control 100A may receive the output signals such as audios, videos or data, processed by the controller 250 and output from the user input interface 265, display the output signals, or output the signals in an audio or vibration form.

In some embodiments, the user may input a user command on the graphical user interface (GUI) shown on the display 275, and then the user input interface 265 receives the user input command through the GUI. The user interface 265 may receive a command configured to control the position of the selector in the GUI so as to select different objects or items.

Or, the user may input a command by inputting specific sound or gesture, and then the user input interface 265 recognizes the sound or the gesture through the sensor so as to receive the command input from the user.

The video processor 270 is configured to receive an external video signal, and perform video data processing such as decompression, decoding, scaling, noise reduction, frame rate conversion, resolution conversion and image synthesis according to a standard encoding and decoding protocol of the input signal so as to obtain the video signal which can be directly displayed or played on the display 275.

For example, the video processor 270 includes a demultiplexing module, a video decoding module, an image synthesis module, a frame rate conversion module, a display formatting module, and the like.

The demultiplexing module is configured to perform demultiplexing processing on an input audio and video data stream. For example, if an MPEG-2 stream (based on a compression standard of digital storage media motion Image and voice) is input, the demultiplexing module demultiplexes it into a video signal, an audio signal and the like.

The video decoding module is configured to process the demultiplexed video signal, including decoding, scaling processing and the like.

The image synthesis module, such as an image synthesizer, is configured to perform overlay blending processing on the GUI signal generated by a graphic generator according to the user input or itself and a video image subjected to scaling processing so as to generate an image signal for being displayed.

The frame rate conversion module is configured to convert a frame rate of the input video, for example, converting the input frame rate 60 Hz video into the frame rate 120 Hz or 240 Hz, and the usual format is implemented in a frame interpolation mode.

The display formatting module is configured to change the signal output from the frame rate conversion module into a signal conforming to a display format of the display, for example, performing format conversion on the signal output from the frame rate conversion module so as to output an RGB data signal.

The display 275 is configured to receive the image signal input from the video processor 270 to display a video, an image and a menu manipulating interface. For example, the display may display a video from the broadcast signal received by the tuning demodulator 210, may also display a video from the communicator 220 or input from the external apparatus interface 240, and may further display an image stored in the memory 260. The display 275 simultaneously displays the user manipulating interface UI generated in the display apparatus 200 and configured to control the display apparatus 200.

The display 275 may include a panel component configured to present a picture and a driving component for driving image display. Or, if the display 275 is a projection display, it may further include a projection apparatus and a projection screen.

The audio processor 280 is configured to receive an external audio signal and perform audio data processing such as decompression, decoding, noise reduction, digital-to-analog conversion and amplifying processing according to a standard encoding and decoding protocol of the input signal so as to obtain an audio signal which can be played in a Speaker device 286.

Exemplarily, the audio processor 280 may support various audio formats, for example, MPEG-2, MPEG-4, advanced audio coding (AAC), high-efficiency AAC (HE-AAC) and other formats.

The audio output interface 285 is configured to receive the audio signal output from the audio processor 280. For example, the audio output interface may output audio from the broadcast signal received by the tuning demodulator 210, may also output audio input via the communicator 220 or the external apparatus interface 240, and may further output audio stored in the memory 260. The audio output interface 285 may include the Speaker device 286, or an external acoustic output terminal 287 output to an external sound device, such as an earphone output terminal.

In some exemplary embodiments, the video processor 270 may include one or more chips. The audio processor 280 may also include one or more chips.

In some exemplary embodiments, the video processor 270 and the audio processor 280 may be a separate chip, or may be integrated in one or more chips together with the controller 250.

The power supply 290 is configured to provide electric power input from an external power source for the display apparatus 200 as power supply support under control of the controller 250. The power supply 290 may be a built-in power supply circuit installed in the display apparatus 200, or a power source installed outside the display apparatus 200.

In some embodiments, most smart televisions may be connected with multiple audio output devices (e.g., a Speaker device, ARC device, BT device, etc.) at the same time. Now a display apparatus generally follows the following playback strategies to determine a playback sequence of the audio output devices.

1) An audio output device which connects with the display apparatus outputs sound first, and other audio output devices are muted.

2) When a current audio output device that outputs the sound is disconnected, a new sound output device is selected from the remaining audio output devices based on a specific mechanism.

3) The user may manually select the sound output device through menu options.

However, in certain scenarios, the above strategies are relatively poor for user experience.

Figure 2:
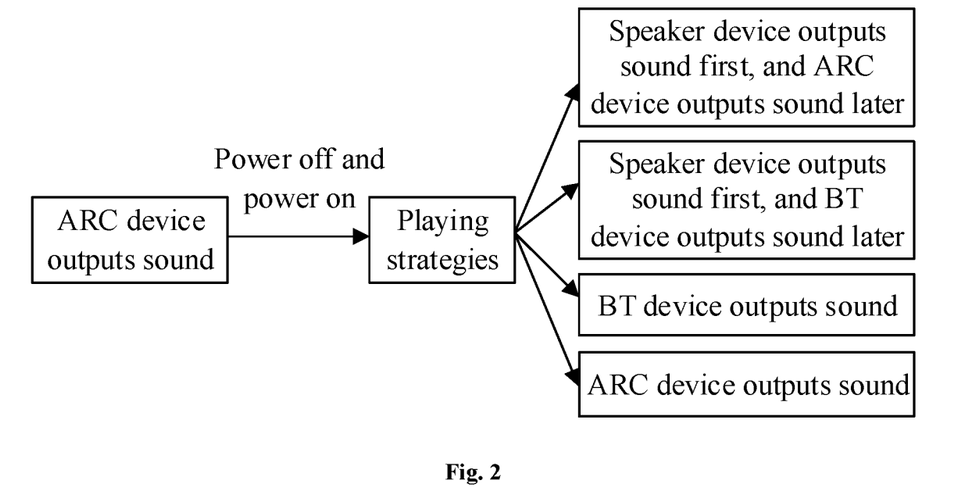
FIG. 2 illustrates a schematic flow diagram of selecting a sound output device during powering on in the related art.

As shown in FIG. 2, when a display apparatus is connected with an ARC device, a BT device, and a Speaker device at the same time to perform DTV playing, it is assumed that a current sound output device is an ARC device. When a display apparatus first cuts off alternating-current power (i.e. power off), like unplugging the cable of the display apparatus and then powers up like plugging the cable of the display apparatus, the display apparatus will enter DTV mode to resume programs before power off. However, since the ARC device and the BT device in connection with the display apparatus are not powered off when the display apparatus is powered off, that is, after the display apparatus is powered off, the external devices connected with the display apparatus in power off state are still powered on. The ARC device and the BT device will connect back with the display apparatus when the display apparatus are powered up again. In this scenario, according to the above playback strategies, the following situations may occur.

If the ARC device and the BT device are relatively slow to connect with the display apparatus again, the Speaker device will output sound for 1-2 seconds. It is assumed that the ARC device is connected first and the BT device is connected later, the BT device will finally output the sound.

If the ARC device and the BT device are relatively slow to connect with the display apparatus again, the Speaker device will output the sound for 1-2 seconds. It is assumed that the BT device is connected first and the ARC device is connected later, the ARC device will finally output the sound.

If the ARC device and the BT device are relatively quick to connect with the display apparatus again, but the ARC device is connected first and the BT device is connected later, the BT device will finally output the sound.

If the ARC device and the BT device are relatively quick to connect with the display apparatus again, but the BT device is connected first and the ARC device is connected later, the ARC device will finally output the sound.

Thus it can be seen that when the display apparatus is powered on after being powered off, sound playing sequence for the ARC device and the BT device are random and unpredictable, resulting in poor user experience.

In view of the above, the present disclosure provides a method for selecting an audio output device and a display apparatus, which can make a sound output device for first sound output after power-on not be determined by a connection time for an external device connecting with the display apparatus, but make the sound output device memorized before power off of the display apparatus match the current sound output device for playback, so that the user has a consistent experience in the power on process of the display apparatus.

Figure 3:
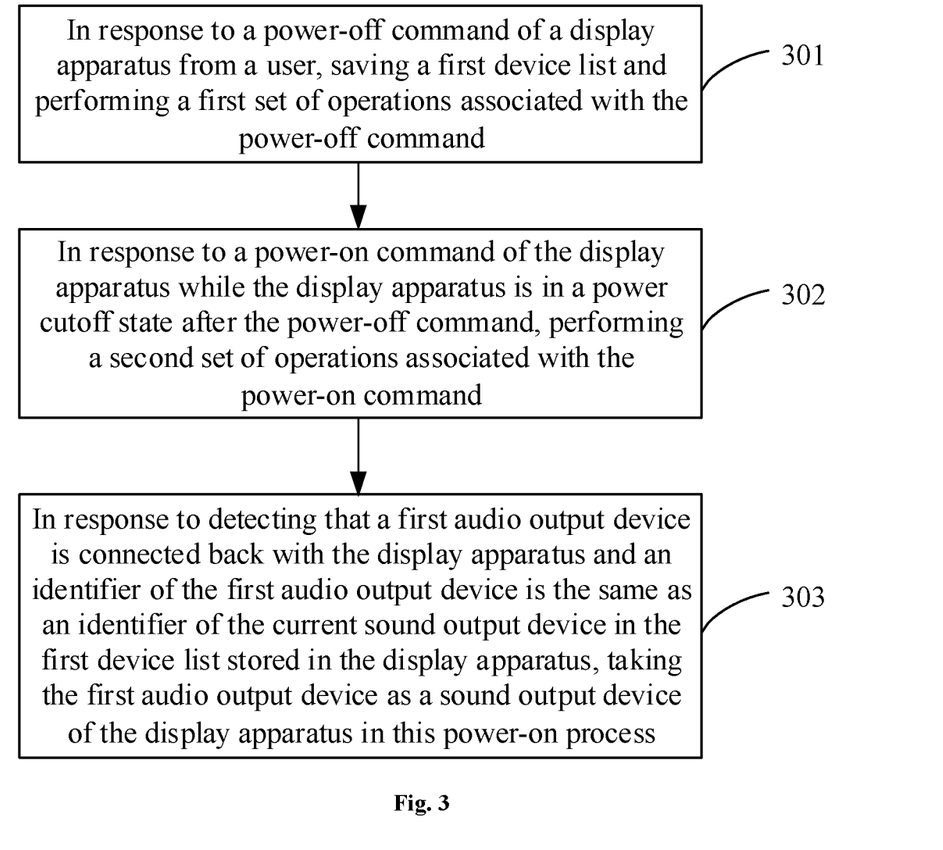
FIG. 3 illustrates a flow diagram of a first method for selecting an audio output device according to the present disclosure.

In a first embodiment, the present disclosure provides a display apparatus. Specifically, the display apparatus includes: a display; a Speaker device, configured to play audio output via a current sound output device; and a controller, configured to execute operations as shown in FIG. 3.

301, in response to a power-off command of a display apparatus from a user, saving a first device list and performing a first set of operations associated with the power-off command. The first device list includes a first audio output device serving as a current sound output device of the display apparatus before the power-off command is stored in the display apparatus. The first set of operations associated with the power-off command includes operations electrically disconnecting from the sound output devices and other operations associated with the display panel, drivers and chips etc., and does not include saving the first device list. The power-off command may be issued by cutting-off power of the display apparatus, like unplugging the cable of the display apparatus.

302, in response to a power-on command of the display apparatus while the display apparatus is in a power cutoff state after the power-off command, and performing a second set of operations associated with the power-on command. The second set of operations associated with the power-on command includes starting the display panel, the drivers and the operating system and detecting the status of one or more audio output devices.

303, in response to detecting that a first audio output device is connected back with the display apparatus and an identifier of the first audio output device is the same as an identifier of the current sound output device in the first device list stored in the display apparatus, taking the first audio output device as a sound output device of the display apparatus in this power-on process.

In a scenario shown in FIG. 2, when a display apparatus is connected with an ARC device, a BT device, and a Speaker device at the same time to play DTV content, it is assumed that a current sound output device of the display apparatus is the ARC device. When the display apparatus first perform the first set of operations for alternating-current power cut-off (i.e., power off), and then performs operations associated with an alternating-current power up (i.e. power on), the display apparatus will enter the DTV mode to resume content playing before previous power off. However, since the ARC device and the BT device are not powered off when the display apparatus is powered cutoff, the ARC device and the BT device will connect back with the display apparatus during a power on process of the display apparatus.

According to the method for selecting the audio output device of the present disclosure, the current sound output device, i.e. ARC device, may be saved before power cut-off of the display apparatus.

Since the Speaker device is different from the saved sound output device ARC device in the first device list stored in the display apparatus, the Speaker device is always muted regardless of whether the Speaker device has connected back with the display apparatus or not during this power on process of the display apparatus.

The connected-back status for the sound output devices which electrically disconnect from the display apparatus during previous power cutoff of the display apparatus is monitored. If the BT device is connected back before the ARC device, the saved sound output device ARC device and the BT device are compared and it is determined that the BT device is different from the saved sound output device ARC device. Therefore, when the current BT device is muted and waits for the ARC device to connect back with the display apparatus, since the ARC device connected back with the display apparatus is the same as the saved sound output device ARC device in the first device list, the ARC device is used as a current sound output device of the display apparatus to play the sound via the Speaker device in this power on process of the display apparatus.

When the ARC device is connected back before the BT device, since it is the same as the saved sound output device ARC device stored in the first device list, the ARC device is used as a current sound output device of the display apparatus to play the sound through the Speaker device. In this case, the BT device does not play even if it is connected back with the display apparatus, but the BT device is muted.

According to the method of the present disclosure, regardless of the connected-back sequence of the ARC device and the BT device, the display apparatus will always play the sound from ARC device, while muting the BT device and the Speaker device, so as to ensure that the ARC device outputs the sound before and after the power cut-off of the display apparatus.

The present disclosure provides a display apparatus. Specifically speaking, the display apparatus may further perform the following operations.

In response to a power-off command, a controller of the display apparatus first saves a first device list in the display apparatus, wherein the first device list includes an identifier associated with one or more audio output devices in connection with the display apparatus before the power-off command and an identifier of a current sound output device of the display apparatus, and performs a first set of operations associated with the power-off command. In some embodiments, the power off command is issued by cutting-off power of the display apparatus instead of pressing the power button on the remote control, for example, unplug electric supply of the display apparatus.

In one example, saving the first device list includes saving a binary numerical value corresponding to an identifier of each audio output device in connection with the display apparatus in the first device list to a first position of an audio information field in a system attribute; and saving a binary numerical value corresponding to the identifier of the audio output device serving as the current sound output device in the first device list to a second position of the audio information field.

For example:

TABLE 1

| Device name | ID |
| --- | --- |
| Speaker device | 0x8000 0001 |
| HDMI_ARC device | 0x8000 0002 |
| BT device | 0x8000 0004 |

Table 1 lists the identifiers of the audio output devices, such as an ID of the device, and the ID corresponding to each audio output device.

In some embodiments, one or more identifiers of one or more audio output device in connection with the display apparatus before power cut-off may be recorded. For example, all the identifiers of the audio output devices in connection with the display apparatus may be saved in the system property attribute (attribute name: persist.sys.media.audiopolicy) in real time. Storing and obtaining of the identifiers of the one or more audio output devices are performed through a system interface property_set function and property_get function. The property will not be cleared with power up and power cut-off of the display apparatus.

The attribute persist.sys.media.audiopolicy is a 16-bit binary numerical value, which is configured to save audio info. A data format is 000y yyyy 000x xxxx.

A low 5 bit (denoted by x) may mark an identifier of an audio output device in connection with the display apparatus. For example, a sum of serial numbers of the last five bits of IDs of all the audio output devices in connection with the display apparatus in Table 1 may be converted into a binary numerical value, and the binary numerical value is filled in a field denoted by x. The one or more audio output devices in connection with the display apparatus may be determined by the binary numerical value.

A low 5 bit (denoted by y) in high 8 bit may mark an identifier of a current sound output device in the display apparatus. For example, the last five bits of IDs of the audio output devices in Table 1 may be converted into a binary numerical value, and the binary numerical value is filled in a field represented by y. The binary numerical value may only correspond to the identifier of one audio output device.

For example, Speaker device (the last five bits of the ID are 00001) and ARC device (the last five bits of the ID are 00002) are devices in connection with the display apparatus. The sum of the last five bits of the ID is 3, which is 11 when converted into binary. If the ARC device is the current sound output device, the last five bits of the ID of the ARC device are 00002, which is 10 when converted into binary, then 000y yyyy 000x xxxx corresponding to the final first device list should be, 0000 0010 0000 0011.

The set of operations for power-on of the display apparatus is executed after receiving a power-on command. When it is detected that the first audio output device is connected with the display apparatus, whether an identifier of the detected first audio output device is the same as the identifier of the current sound output device stored in the first device list is determined.

If the identifier of the detected first audio output device is the same as the identifier of the current sound output device in the first device list, the detected first audio output device is taken as a current sound output device of the display apparatus in this power-up process.

If the identifier of the detected first audio output device is different from the identifier of the current sound output device in the first device list, the identifier of the detected first audio output device is added into in a second device list of the display apparatus which is configured to store one or more audio output devices that have been connected with the display apparatus in this power on process of the display apparatus.

Timing starts when the display apparatus is powered on, and when reaching a first preset time (for example, 5 seconds) after the display apparatus is powered on, whether a current sound output device has been determined for this power up process will be determined.

(1) If a current sound output device has been determined for this power on process of the display apparatus, the first device list is updated so as to make the first device list be the same as the second device list, and the second device list is deleted.

In some embodiments, the updating the first device list comprises following processes.

If there is an identifier for indicating an audio output device in the first device list different from an identifier for indicating an audio output device in the second device list, the identifier of the audio output device in the first device list is modified, so that the identifier of the audio output device in the first device list and the identifier of the audio output device connected with the display apparatus in the second device list are the same.

The reasons why the identifier of the audio device in the first device list is different from the second device list may include two scenarios.

Figure 4A:
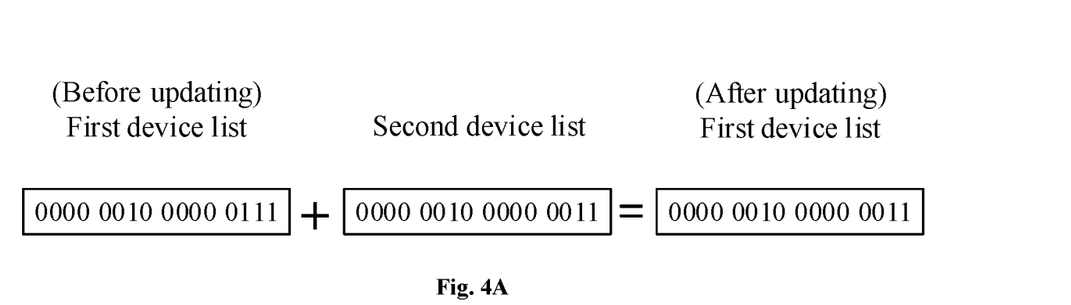
FIGS. 4A, 4B, and 4C illustrate schematic diagrams of updating a device list according to the present disclosure.

The first scenario is that when an audio device is pulled from the display apparatus, as shown in FIG. 4A, it is assumed that the audio output devices in connection with the display apparatus before power off are Speaker device, ARC device and BT device, where ID numbers of the last five bits of the Speaker device, ARC device and BT device are 00001, 00002 and 00004 respectively, a sum of the last five bits of the IDs of the Speaker device, ARC device and BT device is 7, which is 111 when converted into binary. If the ARC device is the current sound output device for the display apparatus, the last five bits of the ID of the ARC device are 00002, which is 10 when converted into binary, and then the first device list specifically includes: 0000 0010 0000 0111.

After the display apparatus is powered on sometime later, it is assumed that the audio devices that are currently in connection with display apparatus are Speaker device and ARC device, and ARC device is the current sound output device, the sum of the last five bits of the IDs of the Speaker device and ARC device is 3, which is 11 when converted into binary, the last five bits of the ID of the ARC device are 00002, which is 10 when converted into binary, and then the second device list specifically includes: 0000 0010 0000 0011.

In the above cases, the identifier in the first device list is different from that in the second device list because of the identifier of the BT device. If there is no identifier corresponding to the BT device in the second device list, it may be determined that BT device is not successfully connected back with the display apparatus. Therefore, the updating the first device list specifically includes: the BT device identifier in the first device list is deleted, so that the updated first device list is the same as the second device list, and then the second device list is deleted.

Figure 4B:
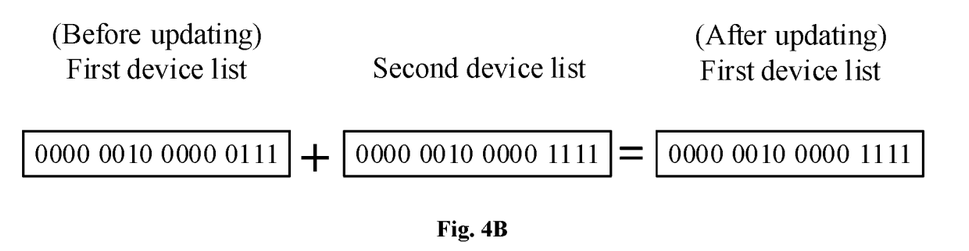

The second scenario is that when an audio device is inserted, as shown in FIG. 4B, it is assumed that the audio output devices that are in connection with the display apparatus before power off are Speaker, ARC device and BT device, where the ID numbers of the last five bits of Speaker device, ARC device and BT device are 00001, 00002 and 00004 respectively, the sum of the last five bits of the IDs of the Speaker device, ARC device and BT device is 7, which is 111 when converted into binary. If the ARC device is the current sound output device, the last five bits of the ID of the ARC device are 00002, which is 10 when converted into binary, and then the first device list specifically includes: 0000 0010 0000 0111.

After the display apparatus is powered on sometime later, it is assumed that the audio devices that are currently in connection with the display apparatus are Speaker device, ARC device, BT device and Spdif device (an ID number of the last five bits is 00008), a sum of the last five bits of the Speaker device, ARC device, BT device and Spdif device is 15, which is 1111 when converted into binary. It is assumed that the ARC device is the current sound output device, the last five bits of the ID of the ARC device are 00002, which is 10 when converted into binary, and then the second device list specifically includes: 0000 0010 0000 1111.

In the above case, the identifier for indicating audio output devices in the first device list is different from the identifier for indicating audio output devices in the second device list because of an identifier of Spdif device. If there is an extra identifier corresponding to Spdif device in the second device list, it may be determined that Spdif device is a device that is newly connected with the display apparatus during power off of the display apparatus. Therefore, the updating the first device list specifically includes: the identifier of Spdif device is added in the first device list, so that the updated first device list is the same as the second device list, and then the second device list is deleted.

If the identifier of the current sound output device in the first device is different from the identifier of the current sound output device in the second device list, the identifier of the current sound output device in the first device list is modified, so that the identifier of the current sound output device in the first device list and the identifier of the current sound output device in the second device list are the same.

Figure 4C:
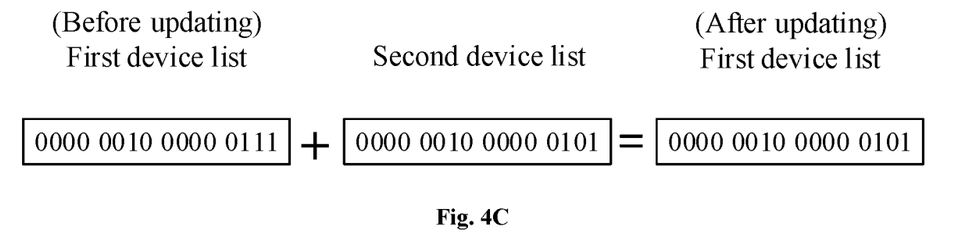

As shown in FIG. 4C, it is assumed that the audio output devices that are connected with the display apparatus before power off are Speaker device, ARC device and BT device, where the ID numbers of the last five bits of the Speaker device, ARC device and BT device are 00001, 00002 and 00004 respectively, the sum of the last five bits of the IDs of the Speaker device, ARC device and BT device is 7, which is 111 when converted into binary. If the ARC device is the current sound output device, the last five bits of the ID of the ARC device are 00002, which is 10 when converted into binary, and then the first device list specifically includes: 0000 0010 0000 0111.

After the display apparatus is powered on sometime later, it is assumed that the audio devices that are connected with the display apparatus currently are Speaker device and BT device, and BT device is the current sound output device, a sum of the last five bits of the IDs of the Speaker device and BT device is 5, which is 101 when converted into binary. If the last five bits of the ID of the BT device are 00004, which is 100 when converted into binary, and then the second device list specifically includes: 0000 0100 0000 0101.

In the above case, the identifier in the first device list is different from that in the second device list because of the identifiers of the BT device and the ARC device. If the identifier of the ARC device is missing from the second device list, it shows that the ARC device may be pulled from the display apparatus during power off. But in the above case, the identifier of BT device is updated as the identifier of the current sound output device, therefore, the updating the first device list specifically includes: the identifier of the ARC device is deleted in the first device list, and the identifier of the current sound output device is changed from the identifier of the ARC device to the identifier of the BT device, so that the updated first device list is the same as the second device list, and then the second device list is deleted.

(2) If no current sound output device has been determined for this power on process of the display apparatus, a second audio output device is determined as the current sound output device from the audio output device in the second device list according to a preset strategy.

For example, it is assumed that the current sound output device before the power off the display apparatus, namely the ARC device is unplugged, the current sound output device cannot be matched by comparing the identifier of the current sound output device in the first device list with a audio device that has connected back with the display apparatus in this power on process within the first preset time, and thus a device with the highest priority is selected from the remaining device list to output sound. For example, the preset priority is: BT device>ARC device>Speaker device sequentially, and Therefore, the BT device may be selected as the new sound output device for this power on process of the display apparatus.

After the current sound output device is determined for this power on process of the display apparatus, the first device list is further updated so as to make the first device list the same as the second device list, and the second device list is deleted.

(3) If the current sound output device is not determined for this power on process of the display apparatus, an interaction window for selecting the sound output device may further be displayed on an interface of the display apparatus, wherein the sound output device for selection is one or more audio output devices in the second device list, so that the user selects a sound output device through the interaction window.

Figure 5:
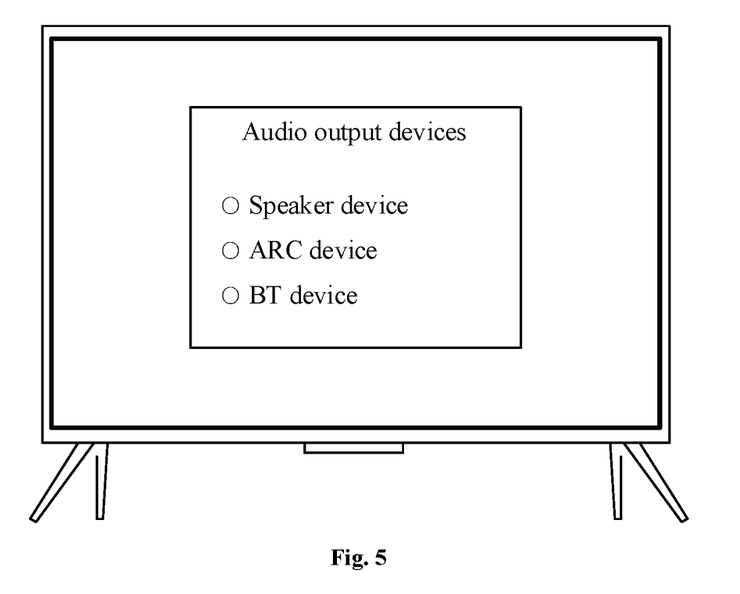
FIG. 5 illustrates a schematic diagram of a prompt window according to the present disclosure.

The interaction window is shown in FIG. 5. A window may be shown in the display interface. The window includes a Speaker device option for selection, which includes the audio output devices currently connected with the display apparatus, such as Speaker device, ARC device, and BT device. The user may select a corresponding audio output device by operating a remote control.

If the second audio output device selected by the user is received in a second preset time (for example, 5 seconds), the second audio output device is determined as the current sound output device, the first device list is updated so as to make the first device list the same as the second device list, and the second device list is deleted.

If the sound output device selected by the user is not received in the second preset time, a third audio output device is determined as the current sound output device from the audio output device in the second device list according to a preset strategy, the first device list is updated so as to make the first device list the same as the second device list, and the second device list is deleted.

Figure 6:
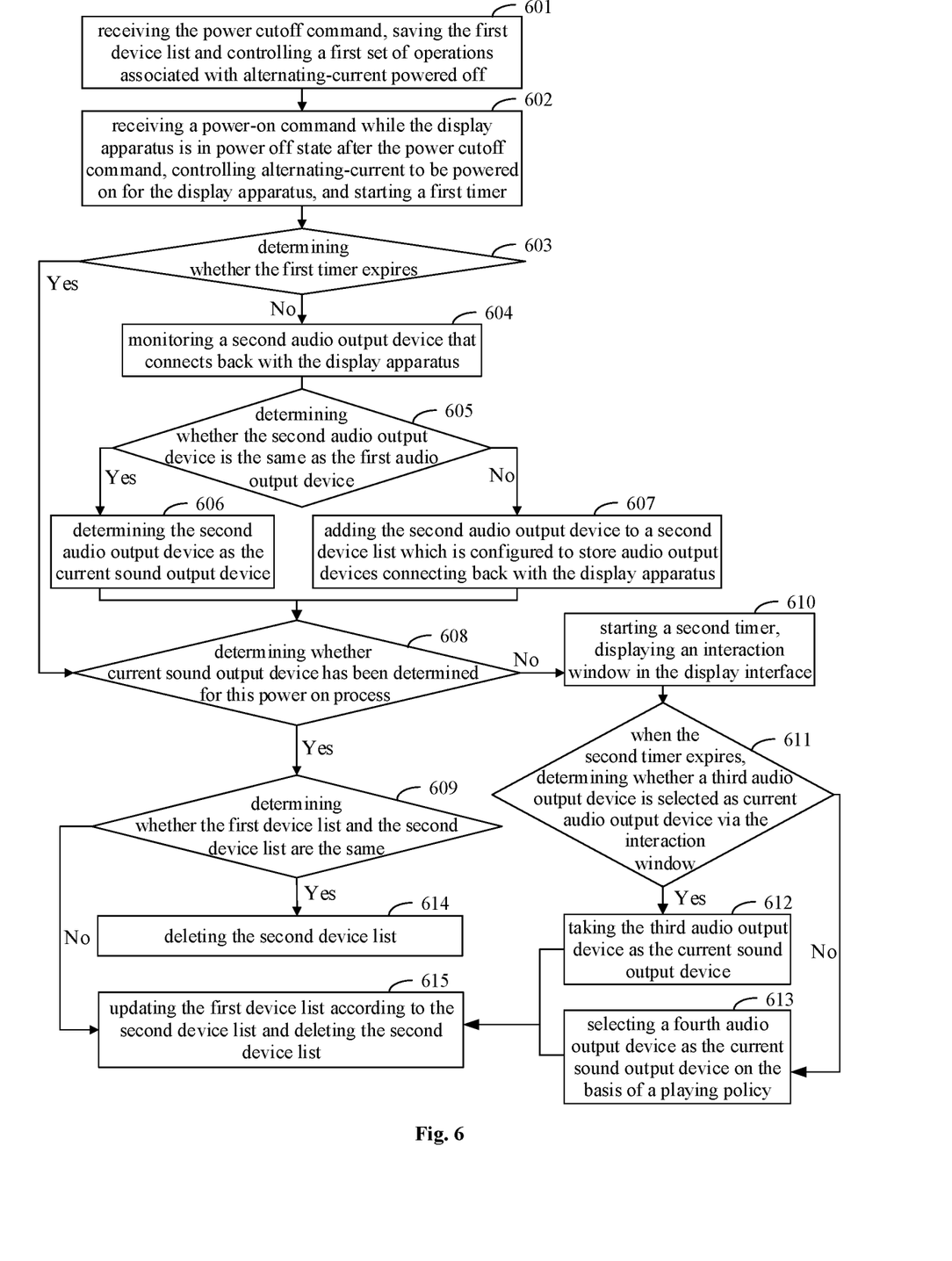
FIG. 6 illustrates a flow diagram of a second method for selecting an audio output device according to the present disclosure.

As shown in FIG. 6, the specific operation process for selecting an audio output device in the embodiment includes the following operations.

601, receiving the power cutoff command, saving the first device list and controlling a first set of operations associated with alternating-current powered off. The first audio output device is the current sound output device before the power cutoff command, the first set of operations associated with AC power off comprises disconnection operations of the sound output devices connected with the display apparatus before the power cutoff command and other operations for the panel, drivers, signal sources and other applications, etc.

602, receiving a power-on command while the display apparatus is in power off state after the power cutoff command, controlling alternating-current to be powered on for the display apparatus, and starting a first timer.

603, determining whether the first timer expires, if the first timer expires, the flow goes to 608; and if not, the flow goes to 604.

604, monitoring a second audio output device that connects back with the display apparatus, and the flow goes to 605.

605, determining whether the second audio output device is the same as the first audio output device, if the second audio output device is the same as the first audio output device, the flow goes to 606; and if the second audio output device is different from the first audio output device, the flow goes to 607.

606, determining the second audio output device as the current sound output device, and then the flow goes to 608.

607, adding the second audio output device to a second device list which is configured to store audio output devices connecting back with the display apparatus, and then the flow goes to 608.

608, determining whether current sound output device has been determined for this power on process, if the current sound output device has been determined, the flow goes to 609; and if no current sound output device has been determined, the flow goes to 610.

609, determining whether the first device list and the second device list are the same, if the first device list is the same as the second device list, the flow goes to 614; and if the first device list is different from the second device list, the flow goes to 615.

610, starting a second timer, displaying an interaction window in the display interface, and then the flow goes to 611.

611, when the second timer expires, determining whether a third audio output device is selected as current audio output device via the interaction window, if yes, the flow goes to 612;

and if not, the flow goes to 613.

612, taking the third audio output device as the current sound output device, and then the flow goes to 615.

613, selecting a fourth audio output device as the current sound output device on the basis of a playing policy, and then the flow goes to 615.

614, deleting the second device list, and then the flow ends.

615, updating the first device list according to the second device list, deleting the second device list, and then the flow ends.

The above embodiments have been described with reference to the specific implementations. However, the above exemplary discussion does not intent to limit the embodiments to the above specific form. Various modifications and variations may be made according to the above teaching. Descriptions of the above implementations are for better explaining the principle and actual application, so that those skilled in the art better use the embodiments.

What is claimed is:

1. A display apparatus, comprising:
a display;
a speaker, configured to play audio output from a sound output device; and
a controller, in connection with the display and the speaker and configured to cause the display apparatus to:
in response to a power cutoff command, save a first device list and perform a first set of operations associated with the power cutoff command, wherein the first device list comprises an identifier of a current sound output device of the display apparatus before the power cutoff command, and the first set of operations comprises electrical disconnection of one or more sound output devices from the display apparatus;
while the display apparatus is in a power off state after the power cutoff command, receive a power on command;
in response to the power on command, perform a second set of operations associated with a power on process of the display apparatus, wherein the second set of operations comprises monitoring connecting status of one or more sound output devices during the power on process;
in response to a first audio output device having connected with the display apparatus, determine whether a first identifier of the first audio output device is same as the identifier of the current sound output device in the first device list; and
in response to the first identifier of the first audio output device being same as the identifier of the current sound output device, take the first audio output device as the current sound output device of the display apparatus in the power on process.

2. The display apparatus according to claim 1, wherein the controller is further configured to:
in response to the first identifier of the first audio output device being not same as the identifier of the current sound output device, add the first identifier of the first audio output device into a second device list which is configured to store one or more devices that have connected with the display apparatus in the power on process.

3. The display apparatus according to claim 2, wherein the controller is further configured to:
in response to the power on command, start a timer with a preset duration; and
in response to the timer reaching the preset duration, determine whether a current sound output device has been determined for the display apparatus in the power on process.

4. The display apparatus according to claim 3, wherein the controller is further configured to:
in response to the current sound output device having been determined for the display apparatus within the preset duration, update the first device list so as to make the first device list be the same as the second device list, and cancel the second device list.

5. The display apparatus according to claim 3, wherein the first device list comprises an identifier for indicating one or more sound output devices that are connected with the display apparatus before the power cutoff command in addition to an identifier for indicating the current sound output device.

6. The display apparatus according to claim 5, wherein the controller is further configured to:
save, an identifier associated with one or more identifiers of the one or more sound output devices that are connected with the display apparatus before the power cutoff command, in a first position of an audio information field in a system attribute of the display apparatus, wherein the audio information field in the system attribute is not cleared before and after power cutoff of the display apparatus.

7. The display apparatus according to claim 6, wherein the controller is further configured to:
save, the identifier of the current sound output device before the power cutoff command, in a second position of the audio information field in the system attribute.

8. The display apparatus according to claim 7, wherein the controller is further configured to:
determine whether the identifier associated with one or more identifiers of one or more sound output devices in the first device list is different from an identifier associated with one or more identifiers of one or more sound output devices in the second device list, modify the identifier associated with the one or more identifiers in the first device list to cause the first device list same as the second device list.

9. The display apparatus according to claim 7, wherein the controller is further configured to:
in response to no current sound output device has been determined for the display apparatus within the preset duration, determine a second sound output device from the second device list as a current sound output device for the display apparatus in the power on process; and save an identifier of the second sound output device in the second device list, wherein the second device list comprises a first position for storing an identifier associated with one or more sound output devices which have connected with the display apparatus in the power on process and a second position for storing an identifier of a current sound output device in the power on process.

10. The display apparatus according to claim 9, wherein the controller is further configured to:
determine whether the identifier of the current sound output device before the power cutoff command in the first device list is same as the identifier of the current sound output device in the second list; and
in response to the identifier of the current sound output device in the first device list being not same as the identifier of the current sound output device in the second list, modify the identifier of the current sound output device in the first device list to cause the first device list same as the second device list.

11. A method for selecting an audio output device in a display apparatus, comprising:
in response to a power cutoff command of the display apparatus, saving a first device list and performing a first set of operations associated with the power cutoff command, wherein the first device list comprises an identifier of a current sound output device of the display apparatus before the power cutoff command, and the first set of operations comprises electrical disconnection of one or more sound output devices from the display apparatus;
while the display apparatus is in a power off state after the power cutoff command, receiving a power on command;
in response to the power on command, performing a second set of operations associated with a power on process of the display apparatus, wherein the second set of operations comprises monitoring connecting status of one or more sound output devices during the power on process;
in response to a first audio output device having connected with the display apparatus, determining whether a first identifier of the first audio output device is same as the identifier of the current sound output device in the first device list; and
in response to the first identifier of the first audio output device being same as the identifier of the current sound output device, taking the first audio output device as the current sound output device of the display apparatus in the power on process.

12. The method according to claim 11, further comprising:
in response to the first identifier of the first audio output device being not same as the identifier of the current sound output device, adding the first identifier of the first audio output device into a second device list which is configured to store one or more devices that have connected with the display apparatus in the power on process.

13. The method according to claim 12, further comprising:
in response to the power on command, starting a timer with a preset duration; and
in response to the timer reaching the preset duration, determining whether a current sound output device has been determined for the display apparatus in the power on process.

14. The method according to claim 13, further comprising:
in response to the current sound output device having been determined for the display apparatus within the preset duration, updating the first device list so as to make the first device list be the same as the second device list, and cancelling the second device list.

15. The method according to claim 13, wherein the first device list comprises an identifier for indicating one or more sound output devices that are connected with the display apparatus before the power cutoff command in addition to an identifier for indicating the current sound output device.

16. The method according to claim 15, further comprising:
saving, an identifier associated with one or more identifiers of the one or more sound output devices that are connected with the display apparatus before the power cutoff command, in a first position of an audio information field in a system attribute of the display apparatus, wherein the audio information field in the system attribute is not cleared before and after power cutoff of the display apparatus.

17. The method according to claim 16, further comprising:
saving, the identifier of the current sound output device before the power cutoff command, in a second position of the audio information field in the system attribute.

18. The method according to claim 17, further comprising:
determining whether the identifier associated with one or more identifiers of one or more sound output devices in the first device list is different from an identifier associated with one or more identifiers of one or more sound output devices in the second device list, modify the identifier associated with the one or more identifiers in the first device list to cause the first device list same as the second device list.

19. The method according to claim 17, further comprising:
in response to no current sound output device has been determined for the display apparatus within the preset duration, determining a second sound output device from the second device list as a current sound output device for the display apparatus in the power on process; and
saving an identifier of the second sound output device in the second device list, wherein the second device list comprises a first position for storing an identifier associated with one or more sound output devices which have connected with the display apparatus in the power on process and a second position for storing an identifier of a current sound output device in the power on process.

20. The method according to claim 19, further comprising:
determining whether the identifier of the current sound output device before the power cutoff command in the first device list is same as the identifier of the current sound output device in the second list; and
in response to the identifier of the current sound output device in the first device list being not same as the identifier of the current sound output device in the second list, modifying the identifier of the current sound output device in the first device list to cause the first device list same as the second device list.

* * * * *